US006851616B2

(12) United States Patent

Maruyama

(10) Patent No.: US 6,851,616 B2
(45) Date of Patent: Feb. 8, 2005

(54) IMAGE FORMING APPARATUS HAVING LIFE INFORMATION

(75) Inventor: Hiroyuki Maruyama, Hachioji (JP)

(73) Assignee: Konica Corporation, Tokyo (JP)

(*) Notice: Subject to any disclaimer, the term of this patent is extended or adjusted under 35 U.S.C. 154(b) by 325 days.

(21) Appl. No.: 10/061,026

(22) Filed: Jan. 30, 2002

(65) Prior Publication Data

US 2002/0108052 A1 Aug. 8, 2002

(30) Foreign Application Priority Data

Feb. 5, 2001 (JP) ....................................... 2001-028047

(51) Int. Cl.[7] ................................................ G06K 19/06

(52) U.S. Cl. ....................... 235/492; 235/376; 235/436; 347/17

(58) Field of Search ................................ 235/492, 376, 235/436; 347/17

(56) References Cited

U.S. PATENT DOCUMENTS 5,021,828 A 6/1991 Yamaguchi et al.
5,835,817 A 11/1998 Bullock et al.
5,940,185 A 8/1999 Inoue et al.
5,995,774 A 11/1999 Applegate et al.
6,039,430 A 3/2000 Helterline et al.
6,332,062 B1 * 12/2001 Phillips et al. ................ 399/12
6,631,967 B1 * 10/2003 Saruta ......................... 347/19
2001/0037462 A1 * 11/2001 Bangston .................... 713/201
2002/0017570 A1 * 2/2002 Shinkai ...................... 235/492

* cited by examiner

*Primary Examiner*—Michael G. Lee
*Assistant Examiner*—Seung H Lee
(74) *Attorney, Agent, or Firm*—Frishauf, Holtz, Goodman & Chick, P.C.

(57) ABSTRACT

An image forming apparatus comprises; an image forming section to form an image and having a plurality of second print boards; and a control section to control the image forming section and having a first print board including a data processing device, wherein each of the plurality of second print boards comprises a printed circuit board, parts mounted on the printed circuit board and a memory device for memorizing life information of the parts.

19 Claims, 9 Drawing Sheets

1 : IMAGE FORMING APPARATUS

IMAGE FORMING APPARATUS HAVING LIFE INFORMATION

BACKGROUND OF THE INVENTION

This invention relates to a memory device, a print board, and an image forming apparatus equipped therewith, and to a method of judgment and processing.

From the view point of environment protection, it has been required in recent years, reuse in which parts on a print board once used are inspected and only those parts that are close to the termination of life (number of years of useful term) are replaced by new ones, or parts on a print board once used are used in a new product; further, in Japan, the promotion of reuse has been provided by legislation and has become an obligation from the year of 2000. Also the reuse of a print board itself which is for use in an image forming apparatus is not an exception, and its reuse is practiced by every manufacturer. As for the parts on a print board which is used in the image forming apparatus, those parts that have a short life, such as an electrolytic capacitor, a light emitting diode (LED), a switching device, a battery, a liquid crystal device, a fuse resistor, a fuse are the objects of parts replacement.

Up to now, as information for making judgment to replace or not to replace, time period of energized state, number of times of energizing, date of electrification, failure information, etc. are memorized centrally in a nonvolatile memory of a control board (hereinafter referred to also as a main board) of an image forming apparatus (Refer to the publications of the unexamined patent application 2000-31610, etc.). Therefore, it has been necessary that data in the nonvolatile memory of the main board of returned copying machines, printers, facsimile machines, etc. were read out, and the information was written in a tag of a paper sheet or an electronic file to be added to every unit (a member composed of one or more print boards having a specified function).

For this reason, in the disassembling process of an image forming apparatus, it has been necessary an operation to prepare the life information corresponding to each of parts on a print board, and in replacing parts in a unit, manufacturers have been putting it in practice to produce control data of each of the parts again on the basis of the above-mentioned information. Further, in the case where a unit including reused parts was built in an apparatus, it was necessary in the assembly process to rewrite data in a nonvolatile memory of the main board memorizing centrally all bits of life information, on the basis of the data received from the unit maker.

Further, there has been also an ill effect that, in the case where the main board was out of order or the nonvolatile memory memorizing centrally the information was broken, the data could not be read out, and all parts that had been used in the apparatus became incapable of reuse.

Further, it has not been heretofore put into practice to memorize a security code together with life information. From now on, with the progressive spread of recycled or reused products, it is supposed that a reuse product which is not genuine (a pirate product) is used for replacement without the recognition of the user, especially in the case where an individual procures a unit to replace, except for the cases of factory-products which are directly delivered by the parts maker and replacements in large-sized machines for which a serviceman replaces the parts. In this case, because the guarantee of the performance of the reused part cannot be secured, it is possible that the part does not work properly, to make the image forming apparatus incapable of being used.

Moreover, because a means for judging whether a reused product can be applied or not is not provided in an image forming apparatus, there has been a possibility that it is not recognized that an inappropriate reused product is erroneously mounted, and the image forming apparatus is shipped as a good product.

It is the first object of this invention to provide a memory device, a print board, and an image forming apparatus equipped therewith, which are capable of making simple the parts information producing process in the disassembling process of an image forming apparatus for reuse, making simple the parts control of a manufacturer in replacing parts of a unit, eliminating the rewriting process of life information in an assembly process of an apparatus, preventing an erroneous description in rewriting life information, unifying the inspection method in various parts and/or units makers and the improvement of the efficiency of inspection operation, and obtaining life information for each of parts even in the case of breakdown of the main board.

The second object is to provide an image forming apparatus and a method of judgement and processing capable of preventing the mounting of an inappropriate reuse part, judging in the image forming apparatus whether a reuse part can be applied to the pertinent model or not, and preventing an erroneous mounting in the assembly process.

SUMMARY OF THE INVENTION

The above-mentioned objects of this invention can be accomplished by any one of the following means.

1. An image forming apparatus provided with a plurality of print boards including at least one print board having a data processing device, characterized by it that there is provided in each of the print boards a memory device for memorizing the life information of parts installed on it.

2. An image forming apparatus as set forth in the above-mentioned 1, characterized by it that the aforesaid memory device is nonvolatile, and the life information can be written and read out for each of the aforesaid print boards by the aforesaid data processing device.

3. An image forming apparatus as set forth in the above-mentioned 1, characterized by it that, in said apparatus, at least one print board having a nonvolatile memory device for which writing and readout can be done by the aforesaid data processing device is used.

4. An image forming apparatus as set forth in the above-mentioned 3, characterized by it that data to be written by the aforesaid data processing device is at least one of the time period of energized state, the number of times of energizing, the date of latest use, and the failure information of a print board.

5. An image forming apparatus as set forth in any one of the above-mentioned 1 to 4, characterized by it that the aforesaid data processing device and each of the respective memory devices of the aforesaid print boards are connected through a serial bus or a parallel bus.

6. A print board for use in an image forming apparatus characterized by being provided with a memory device for memorizing the life information of parts installed on said print board of said image forming apparatus, and a unified interface to make possible the readout and clear of said life information and the writing and readout of the number of times of reuse by an external part life inspection apparatus.

7. A print board as set forth in the above-mentioned 6, characterized by it that the life information is at least one of the time period of energized state, the number of times of energizing, the latest date of use, the failure information, the number of prints produced.

8. A print board as set forth in the above-mentioned 6, characterized by it that the aforesaid memory device is nonvolatile.

9. A memory device provided in a print board of an image forming apparatus for memorizing life information, characterized by it that, in said memory device, a security code is memorized together with the life information.

10. A memory device as set forth in the above-mentioned 9, characterized by it that the aforesaid security code is encrypted.

11. A memory device as set forth in the above-mentioned 9, characterized by it that said security code can be rewritten by the image forming apparatus or by an external part life inspection apparatus.

12. A memory device as set forth in the above-mentioned 11, characterized by it that the aforesaid security code is encrypted.

13. A memory device as set forth in the aforesaid 9 or 10, characterized by it that, in said memory device, the memory area is composed of a first memory area provided with a protect means such that rewriting can be done by an external part life inspection apparatus but cannot be done by the image forming apparatus, a second memory area provided with a protect means such that rewriting can be done by the image forming apparatus but cannot be done by an external part life inspection apparatus, and a third memory area where data can be rewritten by both of the image forming apparatus and an external part life inspection apparatus, the first memory area consists of a first security code (consisting of an ID code and an allowed model code) and a first life information, the second memory area consists of a second life information, and the third memory area consists of a second security code (a USE code).

14. An image forming apparatus provided with a plurality of print boards including at least one print board having a data processing device, characterized by it that a memory device as set forth in the above-mentioned 13 is provided in each of the print boards, the life information and the security code are read out from said memory device, and it is judged whether or not the model code memorized in the control board and the allowed model code in the first security code agrees with each other.

15. An image forming apparatus as set forth in the above-mentioned 14, characterized by it that the first security code out of the first and second security codes is read out at first.

16. An image forming apparatus as set forth in the above-mentioned 15, characterized by it that, in said image forming apparatus, there is provided means for displaying the content to the effect that the both codes do not agree with each other, if the aforesaid judgement is to that effect.

17. An image forming apparatus as set forth in the above-mentioned 15, characterized by it that, in said image forming apparatus, if the aforesaid judgement is such one that the both codes do not agree with each other, the content to that effect is displayed and image forming operation is prohibited.

18. An image forming apparatus as set forth in the above-mentioned 15, characterized by it that, in said image forming apparatus, if the aforesaid judgement is such one that the both codes do not agree with each other, the content to that effect is transmitted to a managing person through a network line or through a telephone line.

19. An image forming apparatus as set forth in the above-mentioned 15, characterized by it that the aforesaid second area is rewritten on the basis of the result of the aforesaid judgement.

20. A method of judgment and processing, wherein a memory device as set forth in the above-mentioned 13 is provided in each of the print boards of an image forming apparatus provided with a plurality of print boards including at least one print board having a data processing device, said method comprising the steps of reading out life information and a security code from said memory device, and judging whether or not the model code memorized in the control board and the allowed model code in the first security code agree with each other.

21. A method of judgement and processing as set forth in the above-mentioned 20, characterized by it that the first security code out of the first and second security codes is read out at first.

In the following, this invention will be explained.

The first object of this invention is accomplished by it that a data processing device is provided in the main board to control the memory in other print boards, a memory device for memorizing information on the life of parts such as the time period of energized state is provided in each of the print boards, and the specification of the interface and the connector between the memory device provided in each of the print boards and an external part life inspection apparatus is unified.

Further, the second object is accomplished by it that a security code or a security code, which is encrypted, is added to the parts life information, and the security code is deciphered in an image forming apparatus such as a copying machine or a printer.

For the print boards composing an image forming apparatus, a control board, a drive board, a sensor board, a high-voltage power-source board, a DC power-source board, an AC drive board, an operation portion board, an image processing board, a lamp drive board, a writing drive board, etc. can be cited. The word "a part on a print board of an image forming apparatus" means a part having a short life such as an electrolytic capacitor, a light emitting diode (an LED), a switching device, a battery, a liquid crystal device, a fuse resistor, and a fuse, and a part having a comparatively long life such as a drive control circuit board, a printer drive IC, and a power source (DC). The objects of control for reuse are mainly parts having a short life.

The word "life information" of an image forming apparatus of this invention means time period of energized state, number of times of energizing, date of the latest use, failure information, number of prints produced, etc.

The word "a nonvolatile memory device" in this invention means a memory device which keeps memory without a power source such as a low-priced EEPROM having a small capacity, an SRAM with a battery, a flash memory having a large capacity, and an EEPROM is desirable in this invention. A data processing device in a main board or an external part life inspection apparatus can perform writing and readout of life information for this memory device. By making the memory device of each board nonvolatile, writing and readout of life information by a print board by itself is possible.

An image forming apparatus of this invention may include an apparatus to be attached to the image forming apparatus mainframe, for example, an FNS (a finisher), an LCT (a large-capacity paper feed tray), an ADF, a DDF (a digital document feeder), etc., and the word "an image forming apparatus" in this invention means an image forming apparatus with one or more of these attached.

In the memory device of each print board of this invention, the data such as the model name, maker name, shipping date, life period of each of the parts are written, and in the part life inspection apparatus, writing of number of times of reuse and clearing of the above-mentioned life information are newly done.

The reason two kinds of protect areas are provided in this invention is that there are two kinds of information, namely, information that should not be rewritten during normal use of the image forming apparatus (the first life information) and information that should not be rewritten in the stage of part life inspection (the second life information). However, if there is the first or second security code, the two kinds of information can be rewritten during the use of the image forming apparatus and at the time of part life inspection respectively.

BRIEF DESCRIPTION OF THE DRAWINGS

FIG. 6 is a flow chart showing the processing to be carried out when the power source of an image forming apparatus is turned on;

DETAILED DESCRIPTION OF THE PREFERRED EMBODIMENT

In the following, a desirable example of the embodiment of this invention will be explained.

Figure 1:
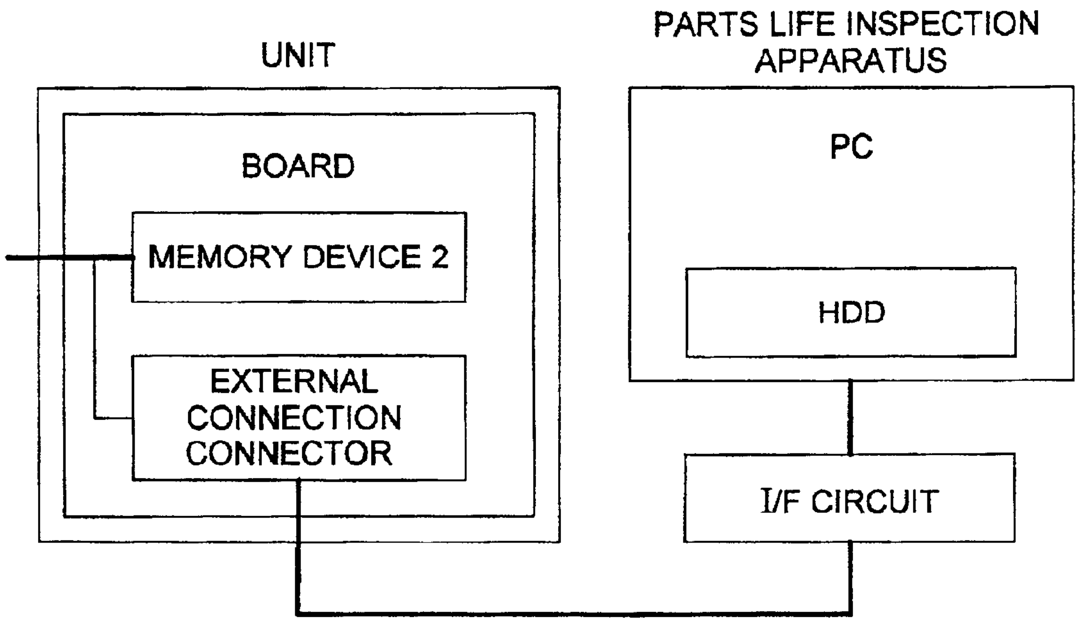
FIG. 1 shows a block circuit diagram of an external part life inspection apparatus and that of a print board to be inspected.

FIG. 1 shows a block diagram of an external part life inspection apparatus and that of a unit to be inspected. A nonvolatile memory device 2 is composed of a memory portion in the narrow sense and an interface circuit (I/F circuit) for writing and readout integrated on a single chip, and is mounted on each print board (hereinafter referred to simply also as a board). For the memory portion in the narrow sense, an EEPROM or a dielectric SRAM is used, and is provided with no back-up battery. The I/F circuit is a serial/parallel conversion circuit or a serial communication control circuit. Further, an external connection connector is provided on each board with the signal arrangement and the connector unified in order that it may be connected to an external part life inspection apparatus through the interface circuit of the part life inspection apparatus. In another way, although it is not described in the drawing, also it is possible to provide a unified print pattern on a print board, which is connected to an external part life inspection apparatus.

A personal computer is used for the external part life inspection apparatus, and data are stored in the HDD of the personal computer from the memory device of each print board through the interface circuit. In another way, it is possible to store data in a data server connected to this personal computer.

Figure 2:
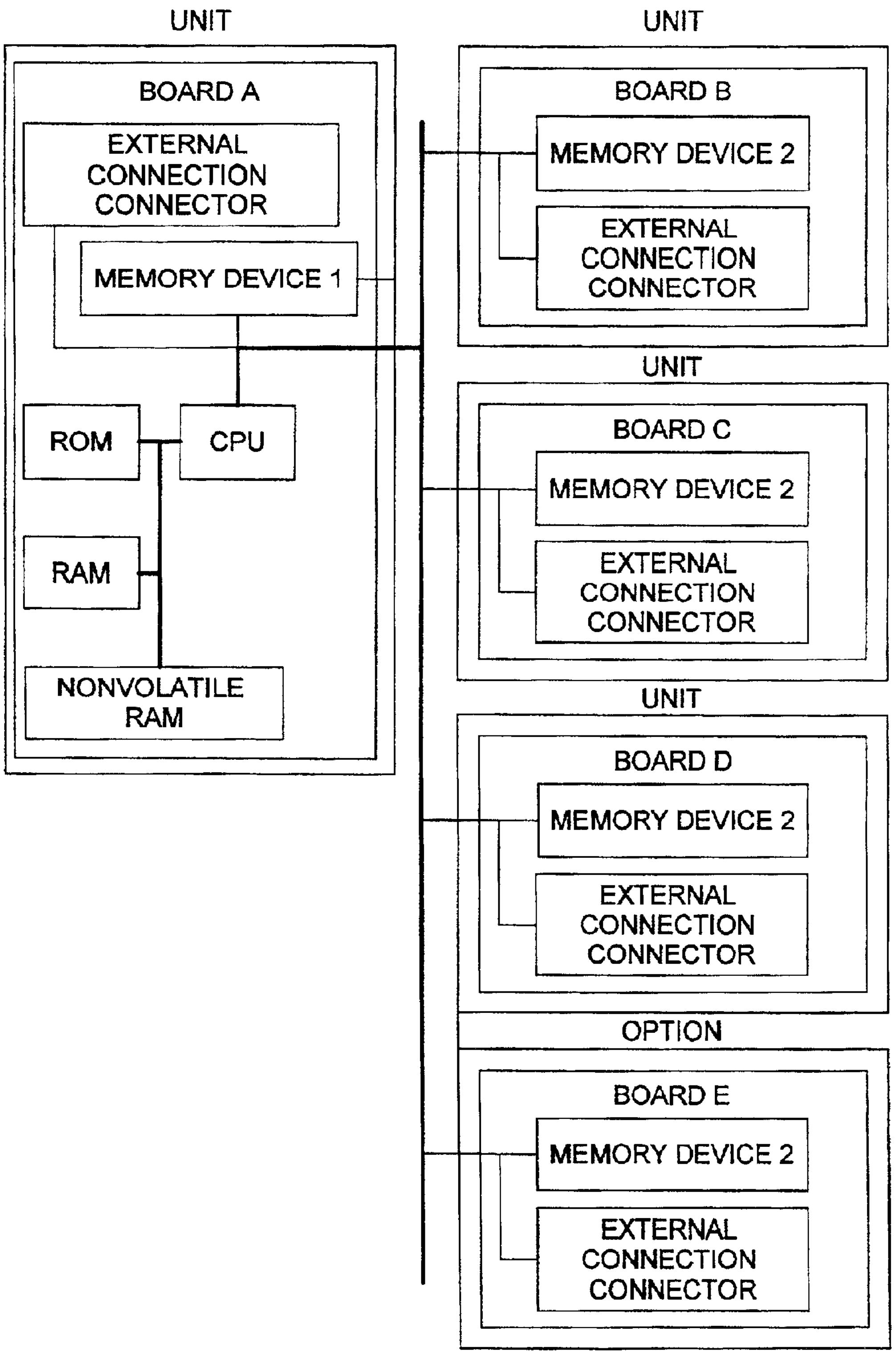
FIG. 2 is a block circuit diagram of print boards of an image forming apparatus.

FIG. 2 is a block circuit diagram of print boards of an image forming apparatus. It is desirable for the reason of total cost that a data processing device (a CPU) is provided in the main board (board A) for controlling the whole image forming apparatus, and is not provided in other boards (boards B, C, and D) and in the board E of the option apparatus.

For a memory device 1 of the main board, it is necessary to memorize, for example, the basic data of the toner concentration of a developer of the copying machine, the charging potential, the number of times of using the photoreceptor, printed area ratio, etc., and a larger capacity than the memory device of other boards is required; therefore, an SRAM with a battery attached, a large-capacity flash memory, or the like is desirable. For the memory device of other boards, an EEPROM is desirable.

The data processing device of the main board is connected to the memory device 1, ROM, RAM, and nonvolatile RAM of the main board, and the memory device 2 of the other boards through a serial bus or a parallel bus. The selection of the kinds of bus is done by taking into consideration the features of the bus such as the communication speed and the cost. Further, also it is possible to carry out writing and readout of the data from the nonvolatile memory by wireless.

The data processing device of the main board can carry out writing and readout of the second life information (to be described later) for the memory device 2 of each print board of the image forming apparatus through the data bus. The part life inspection apparatus can read out the life information of the other print boards collectively via the main board through the external connection connector of the main board. Moreover, also it is possible for the part life inspection apparatus to readout the parts life information of each print board separately through the external connection connector of each board.

Figure 3:
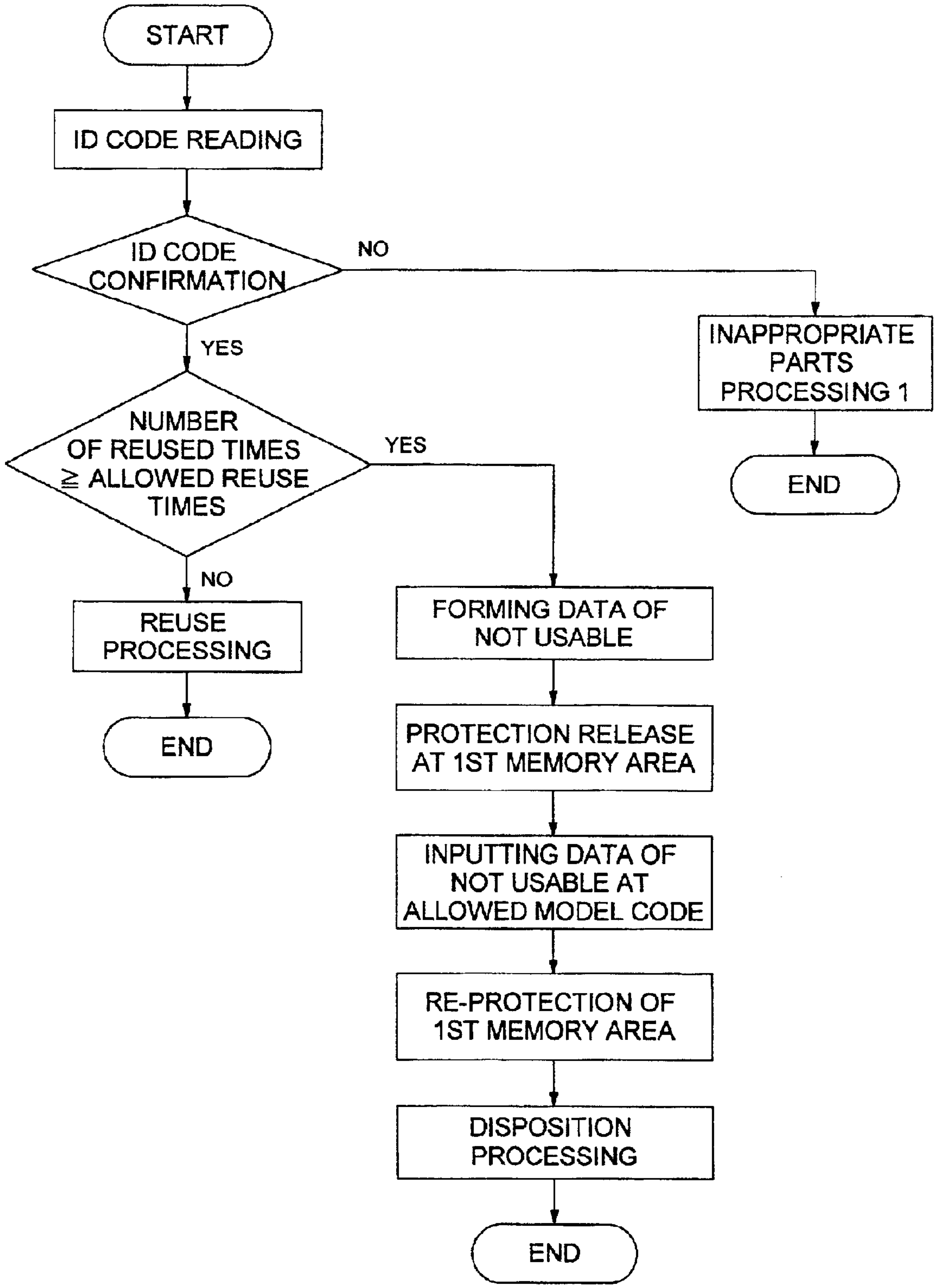
FIG. 3 is a flow chart showing life information processing of a part installed on a print board by an external part life inspection apparatus.

FIG. 3 is a flow chart showing the life information processing of parts installed on a print board by an external part life inspection apparatus. The part life inspection apparatus is connected to the external connection connector of each print board, and the ID code in the first security code memorized in the first memory area of the memory device is read out. The ID code consists of the maker name, the serial number, the names of parts, etc.; if it does not agree with the content of a predetermined code stored in the inspection software of the part life inspection apparatus, the board is judged as an imitation or a non-genuine product, and the inappropriate product processing 1 is practiced. The predetermined code has a character as a password to discriminate an imitation or a non-genuine product. This judgement is programmed in the inspection software of the part life inspection apparatus. In the inappropriate product processing 1, it is displayed in the operation portion that the product is inapplicable, the information that the product is inapplicable is transmitted to a managing person through a network line or a telephone line, or the product is automatically excluded from the operation line as an inappropriate product.

If the ID code agrees with the content of the predetermined code, the number of times of reuse is compared with the predetermined number of times of use allowed. If the number of times of reuse is not less than the number of times of use allowed, a data for prohibiting use (data=0) is produced in the part life inspection apparatus, the first memory area is released from protection, and the produced data for prohibiting use is inputted in the allowed model code. After that, the first memory area is protected again, and disuse processing is practiced. In the disuse processing, after the life information is read out from the memory device, the print board is conveyed to the disuse line. Further, it is desirable that the ID code and the life information are stored in the above-mentioned data server.

If the number of times of reuse is less than the number of times of use allowed, reuse processing is practiced. In the reuse processing, the life information is read out from the memory device, and if there are any parts to be replaced, the list of those parts are outputted. The outputted list is put on the unit or the print board, and conveyed in the reuse line. It is desirable that the ID code, the life information, and the replaced parts list are stored as a history in the above-mentioned data server.

Figure 4:
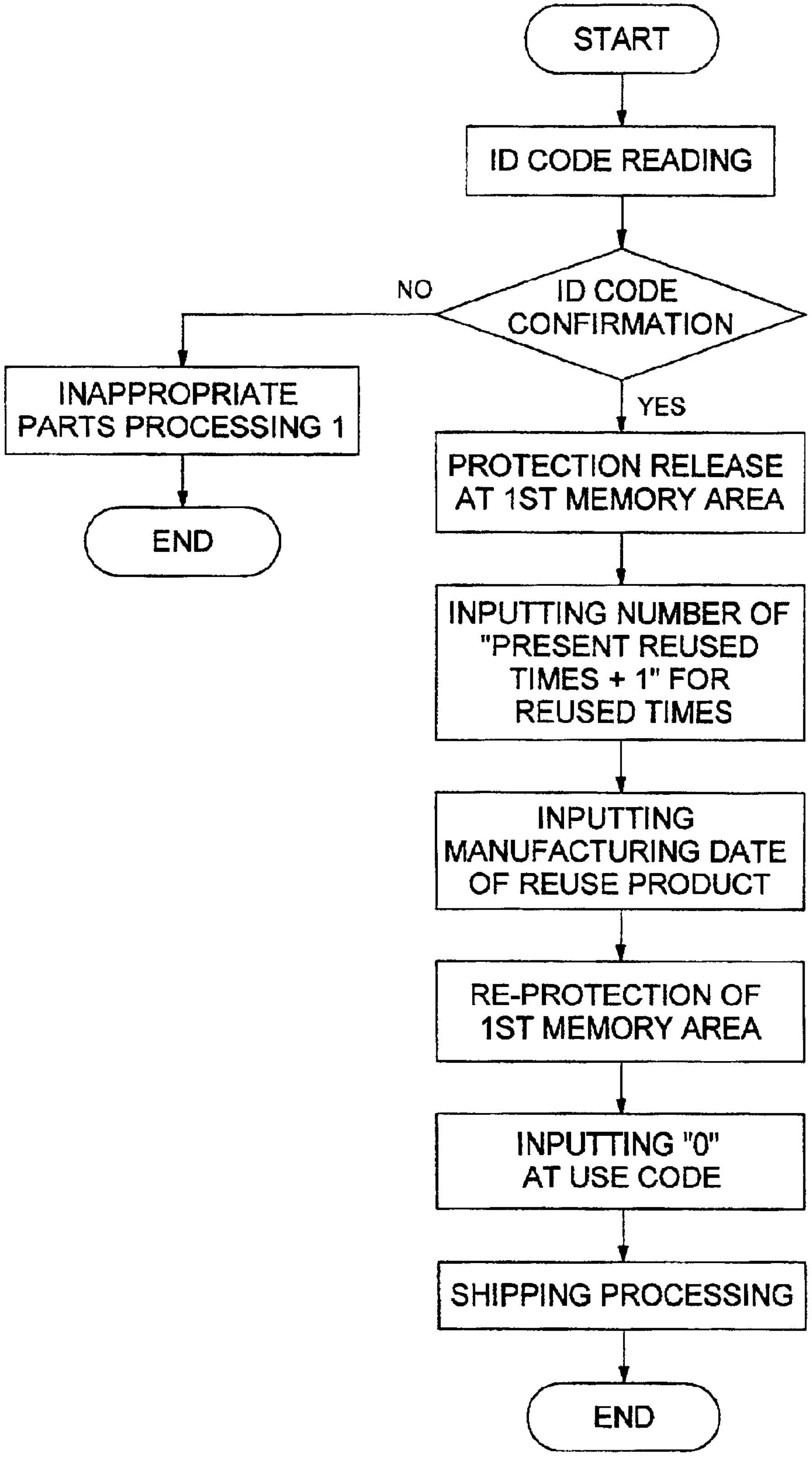
FIG. 4 is a flow chart showing writing processing of life information by an external part life inspection apparatus.

FIG. 4 is a flow chart showing the writing processing of life information done by an external part life inspection apparatus after the completion of the reuse processing and parts replacement. The ID code is read out and if it does not agree with the content of the predetermined code, the part is judged as an imitation or an inappropriate product, the above-mentioned inappropriate parts processing 1 is practiced.

If the ID code agrees with the content of the predetermined code, the first memory area is released from protection, the number of times of reuse, which is a part of the first life information, is increased by one, to be memorized in the memory device, and the manufacturing date of the reuse product is inputted. After that, the first memory area is protected again, the USE code, in which the model code of the image forming apparatus in which the print board has been used is written, is cleared (data=0), and shipping processing is practiced. In the shipping processing, the print board is conveyed to the shipping line. It is desirable that the data of the ID code, the number of times of reuse, and the manufacturing date of the reuse product are stored in the above-mentioned data server.

Figure 5:
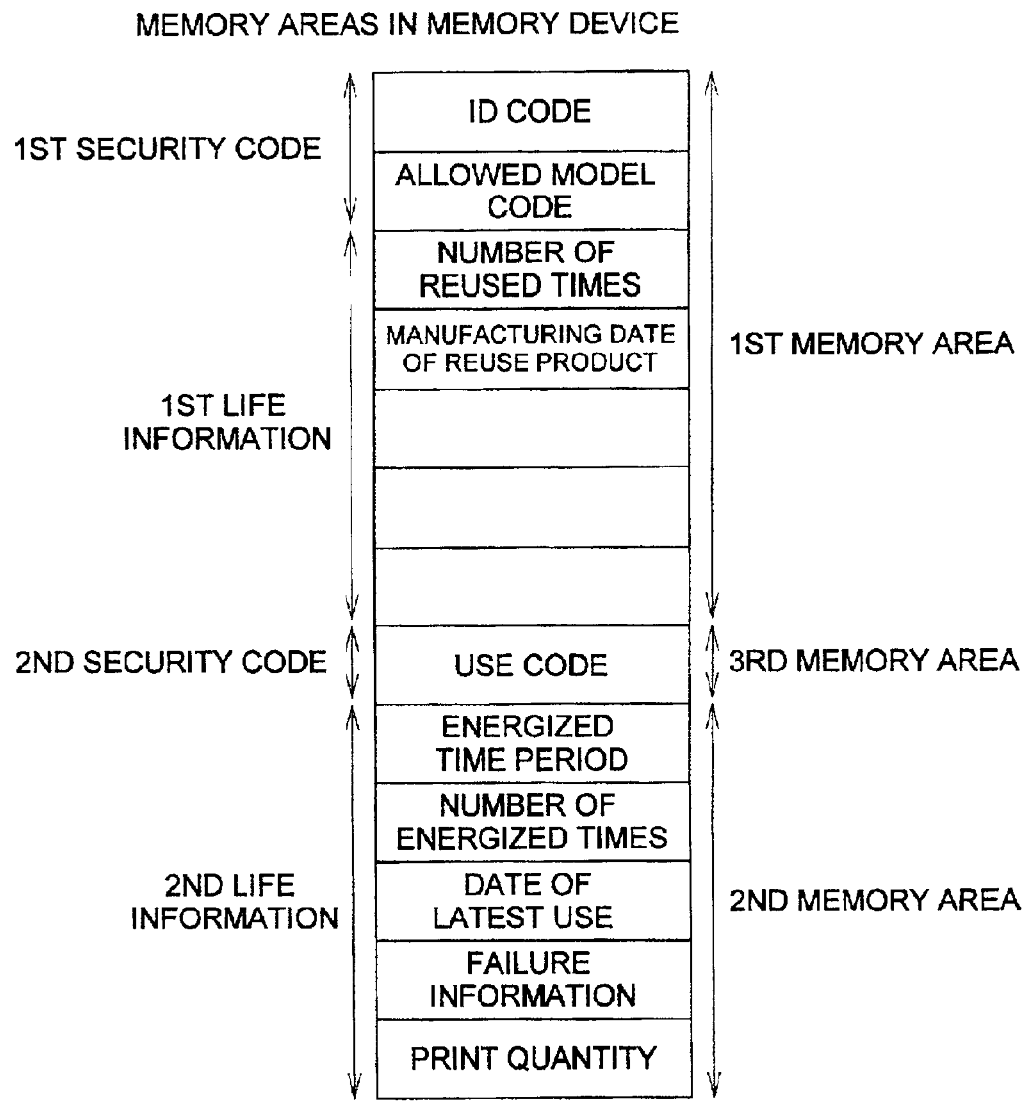
FIG. 5 is a drawing showing the memory area of a memory device.

FIG. 5 is a drawing showing the memory area of a memory device. The memory area is composed of a first memory area provided with a protect means such that data can be rewritten by an external part life inspection apparatus but cannot be rewritten inside an image forming apparatus, a second memory area provided with a protect means such that data can be rewritten inside an image forming apparatus but cannot be rewritten by an external part life inspection apparatus, and a third memory area where data can be rewritten by the both of an image forming apparatus and an external part life inspection apparatus. The first memory area consists of the first security code and the first life information, the second memory area consists of the second life information, and the third memory area consists of the second security code.

The first security code consists of the ID code and the allowed model code, and the first life information consists of the number of times of reuse, the manufacturing date of the reuse product, etc. The second life information consists of the time period of energized state, the number of times of energizing, the date of the latest use, the failure information, the number of prints produced, etc. The second security code (USE code) is a model code of the image forming apparatus in which the board is now used.

It is desirable that the security code is encrypted by adding a special symbol.

Figure 6:
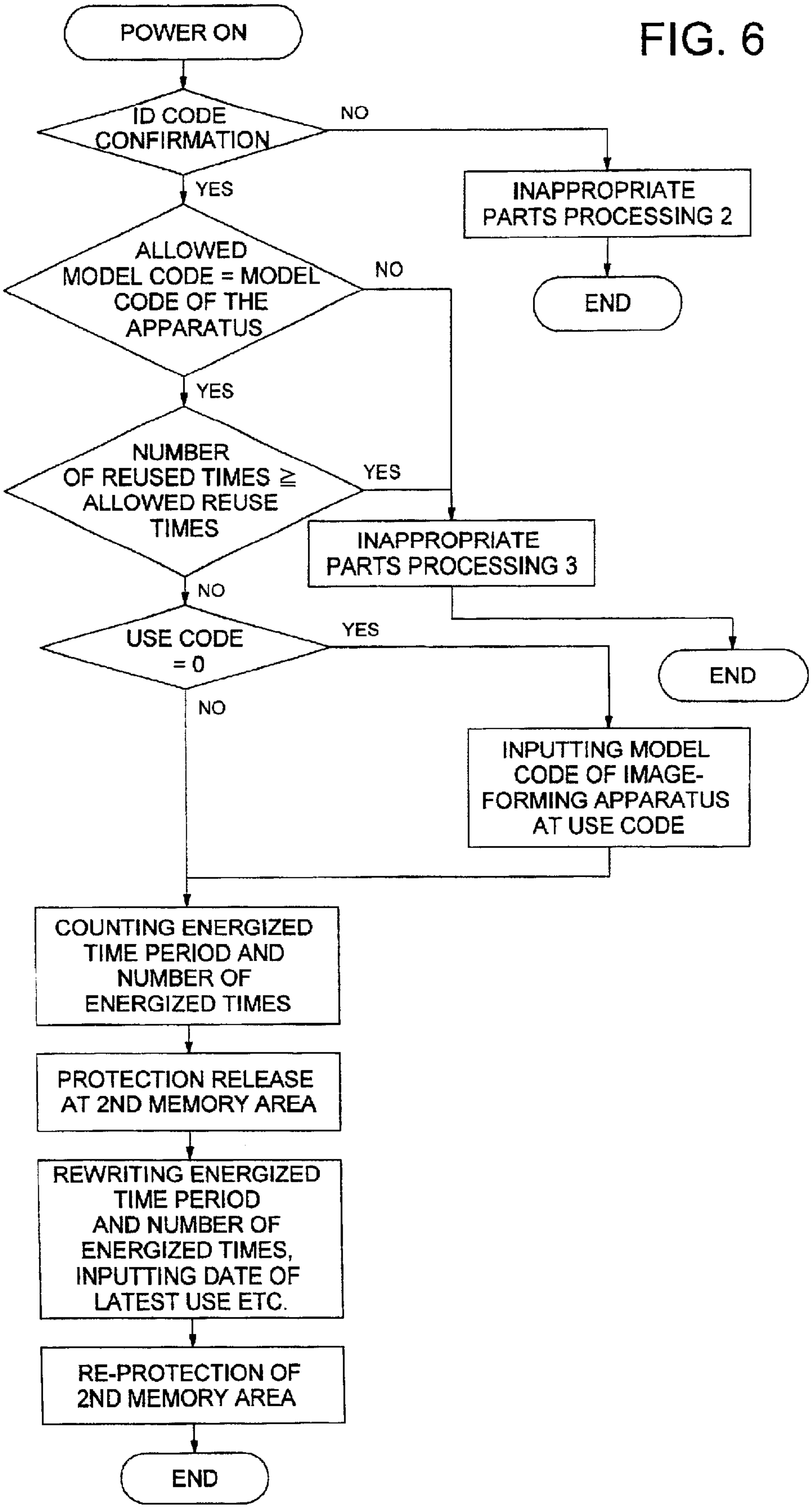

FIG. 6 is a flow chart showing the processing to be practiced when the power source of an image forming apparatus is turned on. An ID code consisting of a maker name, a serial number, the names of parts, etc. is read out from each unit. If an ID code does not agree with the content of the predetermined code, the unit is judged as an imitation or an inappropriate product, and the inappropriate product processing 2 is practiced. How to make these judgements is programmed in a ROM of the main board. In the inappropriate product processing 2, it is displayed in the operation portion that the unit is an inappropriate product not to be applied, or the information that the unit is a product not to be applied is transmitted to a managing person through a network line or a telephone line, and at the same time, image forming operation is prohibited.

If the ID code agrees with the content of the predetermined code, whether or not the image forming apparatus is one of the models capable of using the unit and whether or not the number of times of reuse exceeds the number of times of use allowed are checked. For checking whether or not the image forming apparatus is one of the models capable of using the unit, the allowed model code in the memory device of the unit is compared with the apparatus model code in the ROM of the main board. If the model of the image forming apparatus is one incapable of using the unit, or the number of times of reuse exceeds the number of times of use allowed, the inappropriate product processing 3 is practiced. In the inappropriate product processing 3, it is displayed in the operation portion that the unit is a product not to be applied, or the information that the unit is a product not to be applied is transmitted to a managing person through a network line or a telephone line, and at the same time, image forming operation is prohibited.

If the model of the image forming apparatus is one capable of using the unit, and if the number of times of reuse is less than the number of times of use allowed, it is checked whether the USE code is cleared (data=0). If it is not cleared, the data is left as it is, and if it is cleared, the model code of the image forming apparatus in which the unit is now used is inputted. Next, the time period of energized state and the number of times of energizing are summed up, the second memory area is released from protection, the time period of energized state and the number of times of energizing are rewritten, and other part of the second life information such as the date of the latest use are inputted. After that, the second memory area is protected again.

Figure 7:
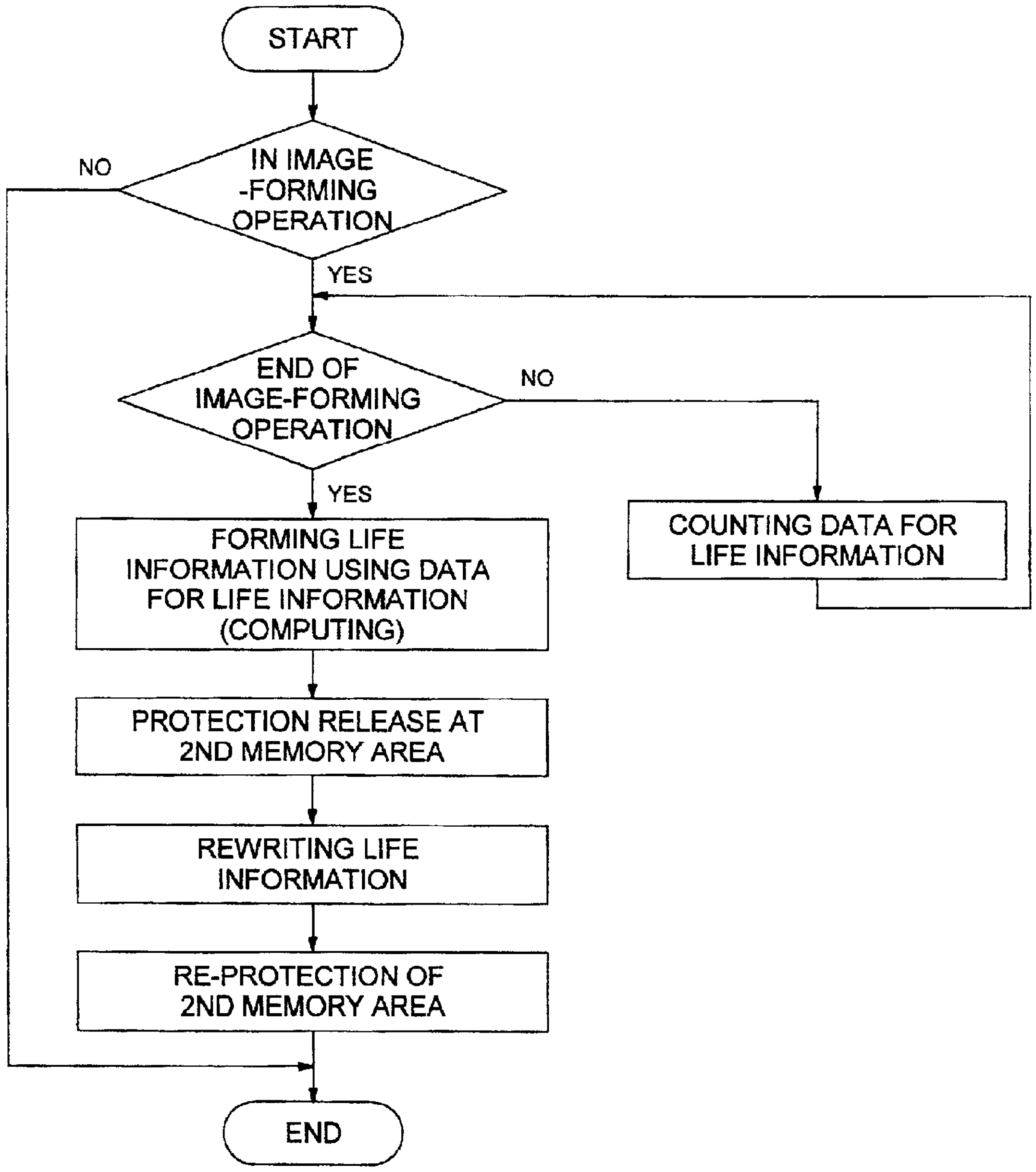
FIG. 7 is a flow chart showing an example of the life information processing of a part installed on a print board by an image forming apparatus.

FIG. 7 is a flow chart showing an example of the life information processing of parts installed on print boards by an image forming apparatus. During the image forming operation (during the copying or printing operation), life information data such as the number of times of image formation (such as the number of prints produced), the working time of a print board, etc. are measured, and temporarily memorized in the memory device of the print board or in an internal register of the CPU of the main board. At the completion of image forming operation, life information is produced (by operation processing) on the basis of these data, the second memory areas of the respective print boards are released from protection, the life information is inputted, and after that, the second memory areas are protected again.

In another embodiment, during the image forming process of the image forming apparatus, the produced life information of each of the print board can be memorized in the memory device of the respective print board.

Figure 8:
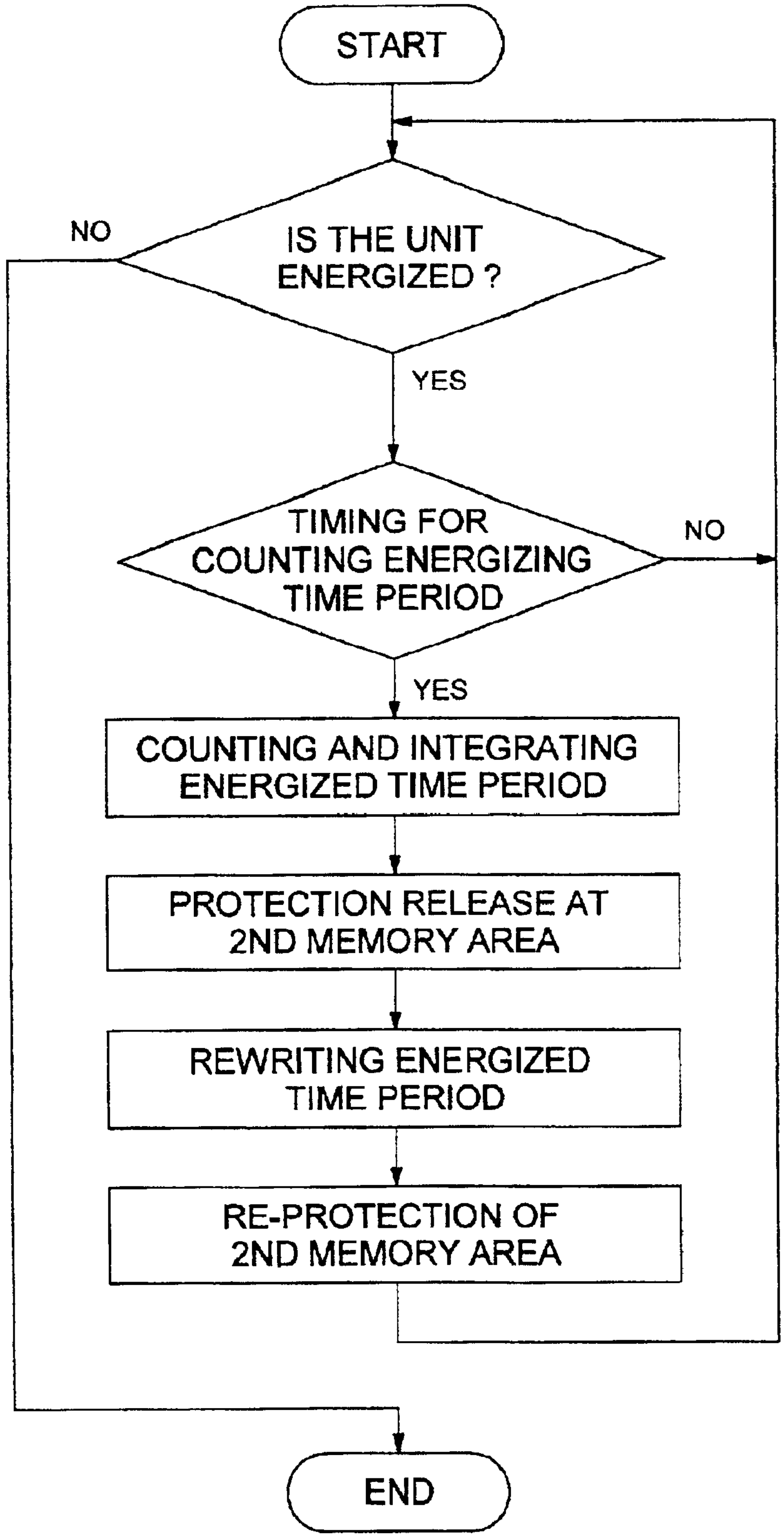
FIG. 8 is a flow chart showing another example of the life information processing of a part installed on a print board by an image forming apparatus.
Figure 9:
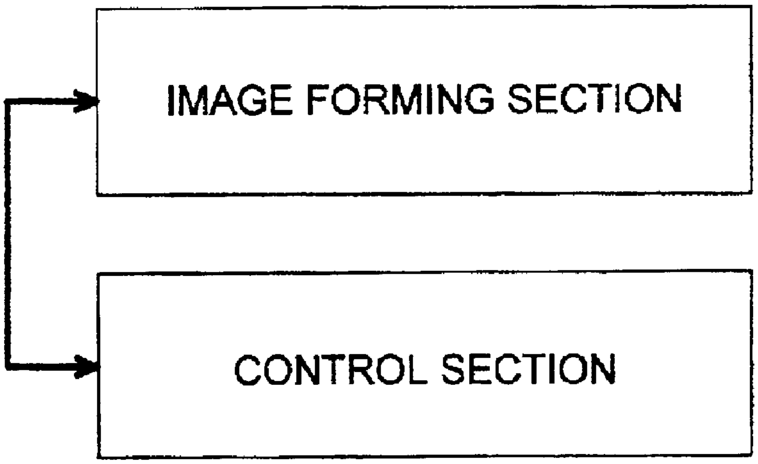
FIG. 9 is a block diagram showing a construction of the image forming apparatus.

FIG. 8 is a flow chart showing another example of the life information processing of parts installed on print boards by an image forming apparatus. It is checked whether or not electric power is supplied to a unit; if it is supplied, the time period of energized state is measured and accumulated at a predetermined timing for measuring/summing up the time period, the second memory area is released from protection, the cumulative time period of energized state is rewritten by adding the time period of energized state, and after that, the second memory area is protected again. This routine is repeated while electric power is supplied to the unit at the predetermined timings for measuring/summing up the time period. If electric power is not supplied to the unit, or if it is not the predetermined timing for measuring/summing up the time period, this processing is not practiced.

The Effect of the Invention

By this invention, it is possible to provide a memory device, a print board, and an image forming apparatus equipped therewith, which are capable of making simple the parts information producing process in the disassembling process of an image forming apparatus for reuse, making simple the parts control of a manufacturer in replacing parts of a unit, eliminating the rewriting process of life information in an assembly process of an apparatus, preventing an erroneous description in rewriting life information, unifying the inspection method in various parts and/or units makers and the improvement of the efficiency of inspection operation, and obtaining life information for each of parts even in the case of breakdown of the main board.

Further, it is possible to provide an image forming apparatus and a method of judgement and processing capable of preventing the mounting of an inappropriate reuse part, judging in the image forming apparatus whether a reuse part can be applied to the pertinent model or not, and preventing an erroneous mounting in the assembly process.

What is claimed is:

1. A print board for use in an image forming apparatus, said print board comprising:

at least one part mounted on the print board;

a memory device for storing life information of the part; and an external connect connector having a common specification with an external connection connector of an additional print board used in the image forming apparatus;

wherein an external part life inspection apparatus is connectable to the memory device through the external connection connector to read cut and clear the life information and to write and read out the number of times of reuse of the part; and wherein the external part life inspection apparatus determines whether each part mounted on the print board can be supplied for reuse based on the life information and the number of times of reuse of the part.

2. An image forming apparatus using the print board according to claim 1, comprising:

an image forming section which includes at least one said print board; and a control section which controls the image forming section, and which comprises a main print board including a data processing device, wherein the data processing device is adapted to write in and read out the life information to and from the at least one print board.

3. The image forming apparatus of claim 2, wherein the memory device comprises a nonvolatile memory.

4. The image forming apparatus claim 3, wherein data to be written by the data processing device comprises at least one of a time period of energized state, a number of times of energizing, a date of latest use, and failure information of the at least one print board.

5. The image forming apparatus of claim 2, wherein the data processing device and the memory device of the at least one print board are connected through one of a serial bus and a parallel bus.

6. The image forming apparatus of claim 2, wherein the memory device stores a security code together with the life information.

7. The image forming apparatus of claim 6, wherein the security code is encrypted.

8. The image forming apparatus of claim 6, wherein the security code is rewritable by at least one of the image forming apparatus and by the external part life inspection apparatus.

9. The image forming apparatus of claim 8, wherein the security code is encrypted.

10. The image forming apparatus of claim 8, wherein the memory device comprises:

a first memory area provided with first protection means for permitting rewriting by the external part life inspection apparatus and for prohibiting rewriting by the image forming apparatus;

a second memory area provided with second protection means for permitting rewriting by the image forming apparatus and for prohibiting rewriting by the external part life inspection apparatus; and a third memory area where data is rewriting by both of the image forming apparatus and the external part life inspection apparatus;

wherein the first memory area stores first life information and a first security code including an ID code and an allowed model code, the second memory area stores second life information, and the third memory area stores a second security code.

11. The image forming apparatus of claim 10, wherein the control section reads out the life information and the security code from the memory device, and judges whether a model code stored in the control section and the allowed model code in the first security code agree with each other.

12. The image forming apparatus of claim 11, the control section reads out the first security code before the second security code.

13. The image forming apparatus of claim 12, wherein the control section further comprises a display unit to display a judgment result of the control section if the control section makes a judgment that the model code stored in the control section and the allowed model code in the first security code do not agree with each other.

14. The image forming apparatus of claim 12, wherein if the control section judges that the model code stored in the control section and the allowed model code in the first security code do not agree with each other, the display unit displays a result of the judgment and the control section prohibits an image forming operation.

15. The image forming apparatus of claim 12, wherein if the control section judges that the model code stored in the control section and the allowed model code in the first security code do not agree with each other, the control section transmits a result of the judgment to a managing user through at least one of a network line and a telephone line.

16. The image forming apparatus of claim 12, wherein the second memory area is rewritten based on a result of the judgment.

17. The image forming apparatus of claim 10, wherein the second security code comprises a USE code.

18. The print board of claim 1, wherein the life information include at least one of a time period of energized state, a number of times of energizing, a latest date of use, failure information, and a number of prints produced.

19. The print board of claim 1, wherein the memory device comprises a nonvolatile memory.

* * * * *